United States Patent Office 2,733,165
Patented Jan. 31, 1956

2,733,165

FLUORESCENT WHITENING AGENTS

William Wilson Williams and Harlan Benjamin Freyermuth, Easton, Pa., assignors to General Aniline & Film Corporation, New York, N. Y., a corporation of Delaware No Drawing. Application December 7, 1953,
Serial No. 396,726

6 Claims. (Cl. 117—33.5)

This invention relates to novel (4,5)triazolyl-(2) benzidine sulfanes, and more specifically to sulfo-containing X,X' - bis[naphtho - (4,5)triazolyl(2)]benzidine sulfanes possessing new and useful properties which render them particularly useful as fluorescing optical bleaching or whitening agents.

It is well-known that textiles tend to develop a yellowish shade on aging which cannot be removed by ordinary bleaching or washing. The prior methods of "bluing" white materials with blue pigments or fugitive blue dyestuffs has largely been superseded in modern practice of laundering by addition of a fluorescent optical bleaching agent (brightener) with the soap or detergent in the washing bath. The brightening agent is conveniently supplied commercially in the form of an intimate admixture with detergent or soap in bars, flakes, powders etc. The fluorescent optical bleaching agents by absorbing ultraviolet radiations and emitting light within the visible range, tend to neutralize any yellowness of the material and thus increase the apparent whiteness thereof.

As example of the types of compounds which have been suggested for use as fluorescent brightening agents may be mentioned: (A) acylated derivatives of 4,4'-diamino stilbene-2,2' disulfonic acid or diamino diphenyl sulfonic acids obtained by condensing two molar proportions of a benzoyl chloride with one molar proportion of the 4,4'-diamino stilbene-2,2'-disulfonic acid or diamino diphenyl sulfonic acid, a number of specific agents of this type being disclosed, for example, in U. S. Patent #2,581,059 of Witte, British Patent 584,484 and Patent 2,643,198 of Savidge et al.; (B) triazyl derivatives of diamino stilbene disulfonic acid or diamino diphenyl sulfonic acid obtained by condensing 2 molar proportions of cyanuric chloride with 4,4'-diaminostilbene-2,2'-disulfonic acid (or diamino diphenyl sulfonic acid) and then condensing the thus obtained tetra chloro product with 4 molar proportions of the same or different primary amines, alcohols or phenols, a number of specific agents of this type being disclosed in application Serial #381,856, published May 11, 1943, by the Alien Property Custodian and U. S. Patent 2,618,636, Williams et al.; and (C) the acylated derivatives of diamino dibenzothiophene dioxide, a number of specific compounds being disclosed in U. S. Patents 2,563,493 and 2,563,795 of Scalera et al.

It will be noted that these known fluorescent brightening agents are derivatives of aromatic diamines, the amino groups of which have been condensed with various benzoyl chlorides, cyanuric chlorides, etc. as described in the above mentioned patents; or one of the amino groups has been so condensed and the other reacted with phosgene so as to produce a symmetrical bis ureido derivative.

We have now discovered that valuable novel fluorescent brightening agents may be obtained from the same type of aromatic diamines which have been used in known fluorescent agents; if instead of condensing the amino groups with such reactants as benzoyl chloride, cyanuric chloride, and the like, one or both of the amino groups is diazotized and a thus obtained diazo coupled with aromatic primary amine (which is devoid of chromophoric groups and which couples ortho to its primary amino group) and the thus obtained azo or disazo dye is then subjected to oxidation under suitable conditions, so that, a ring closure reaction occurs and a triazole ring is formed of which the primary amino group of the coupler is one of the hetero atoms.

These novel fluorescent brightening agents, which we have discovered may be characterized as: condensed ring triazolyl derivatives containing a multicyclic aromatic bridging group and containing water-alkali solubilizing groupings. These novel compounds are extremely valuable fluorescing agents which fluoresce with a desirable shade and impart to cellulosic fibers an extremely desirable and subjectively pleasing bright whiteness. Also, we find that the novel compounds possess a substantially better chlorine fastness than known bis [(substituted 2,4 - diamino) - 1,3,5 - triazinyl(6)]4,4'-diaminostilbene-2,2'-disulfonic acids, aroylamides of 4,-4'-diaminostilbene-2,2'-disulfonic acids or their salts.

Our novel compounds impart a less green cast to treated cellulosic fibers, which is subjectively more pleasing and of greater apparent whiteness than the aroylamides of 3,7-diamino-dibenzothiophene-5,5-dioxide sulfonic acid salts, which impart to fabrics and to soap- or detergent-brightener compositions an esthetically undesirable green hue. In addition, our novel compounds have equal stability and in some cases improved fastness over known related compounds in regard to resistance to common agents such as soap, laundry bleach, etc., are substantially free from any tendency to decompose to colored products on aging or elevated temperatures as in ironing, are particularly strong in fluorescence, and are reasonably low in cost of production in proportion to their effectiveness. The absorption maximum of our products in the ultraviolet is closer to the visible wave lengths than most of the known brighteners and hence are particularly effective in absorbing the ultraviolet rays in the near visible region with corresponding high efficiency in emitting visible light waves. These compounds to an amazing degree combine the various desirable attributes of fluorescent brighteners. Fabrics washed with soaps or other detergents containing small amounts of the novel compounds, usually in the form of the sodium or other alkali metal salts become much brighter and whiter in the case of colors than fabrics which are washed with ordinary soaps or detergents and have a much more desirable appearance than fabrics washed with soaps or detergents in which previously known fluorescent agents are incorporated. These compounds may also be incorporated in synthetic fibers and films, especially those of cellulosic origin such as regenerated cellulose, cuprammonium cellulose, cellulose acetate and the like, by adding a small amount thereof to the spinning solutions or precipitating baths in order to effect a noticeable whiteness of the finished material.

Due to the ease of preparation and their desirable properties, the preferred componds of the present invention are bis triazoles which may be represented by the following general formula:

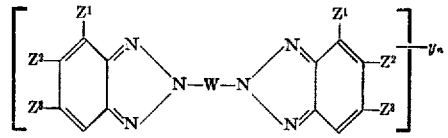

wherein W represents a divalent residue of dibenzothiophene-5,5-dioxide, and the lower alkyl, lower alkoxy or halogenated derivatives thereof; where $Z^1$, $Z^2$ and $Z^3$ represent hydrogen; lower alkyl, e. g. methyl, ethyl;

lower alkoxy, e. g. methoxy, ethoxy; halo, e. g. chloro; acylamino, e. g. acetylamino, benzoylamino, lower alkylsulfonamido (methylsulfonamido), benzenesulfonamido; N,N-di-(lower alkyl) amino, e. g. N,N-dimethylamino; where $Z^2$ and $Z^1$ may together represent a condensed ring system; where $Z^2$ and $Z^3$ may together represent a condensed ring system; where $y$ represents a water solubilizing group such as —$SO_3M$, —COOM, —$SO_2NH_2$, where M represents a metallic or ammonium cation; where $n$ represents a numeral whose value is less than 6.

The terms symmetrical and unsymmetrical are used herein to denote componds in which the terminal portions of the molecule connected to the bridging component are identical or dissimilar, respectively.

While the preferred compounds of the present invention are bis-triazoles of the formula given above, it has been found that compounds derived from aromatic diamines, of the type forming the central portion of prior art fluorescent brightening agents, in which one of the amino groups has been condensed with benzoyl chloride, cyanuric chloride, etc. and in which the other amino group has been diazotized, coupled with the primary aromatic amine which couples ortho to the amino group and the thus obtained monoazo dye oxidized so as to form a triazole compound, are also useful as fluorescent brightening agents and such mono triazole derivatives are therefore included within the scope of the present invention. Generically, therefore, the novel compounds of the present invention may be described as fluorescent brightening agents which are devoid of chromophoric groups and which contain at least one

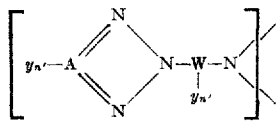

or

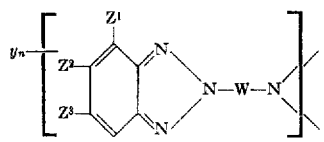

moiety, wherein A is an aro grouping (i. e. condensed ring aromatic grouping) joined through adjacent carbons thereof to the nitrogeneous portion of the triazole ring where $n'$ represents 0, 1, 2 and 3; and wherein the values of W, $y$, $n$, $Z^1$, $Z^2$ and $Z^3$ represent the values denoted above and wherein the nitrogen valences may be satisfied (1) by being a part of an aro triazole group which may be either dissimilar from or identical to the aro triazole group of the moiety; or (2) by being a part of an acylamido, urea or a triazinyl derivative.

The symmetrical bis triazoles can be prepared by coupling one mole of the tetrazotized diamino bridge linking component with two moles of an ortho-amino-coupling arylamine (e. g. an arylamine capable of coupling in the ortho position to the primary amino group of the arylamine) to a bis azo compound and oxidation thereof to the symmetrical bis triazole.

The unsymmetrical bis triazoles can be prepared either (a) by coupling the tetrazotized diamino bridge linking component stepwise with two dissimilar ortho-amino-coupling arylamines and oxidation or (b) by diazotizing the amino nitro derivative of the multicyclic aromatic bridging component, coupling to an ortho-amino-coupling arylamine, reducing, diazotizing and coupling with a second ortho-amino-coupling arylamine, followed by oxidation of the unsymmetrical bis azo compound to the unsymmetrical bis triazole.

As indicated above, the nitrogen valences may be a part of an acylamido, urea or a triazinyl grouping which may be prepared by reaction of the amino derivative of the moiety (from (b) in the preceding paragraph) respectively with an acylating agent, an isocyanate or cyanuric choloride (in the latter case, the dichloro product is further reacted with two moles of a primary or secondary amine or one mole of each of two dissimilar primary or secondary amines to yield a trisubstituted triazino derivative of the aforementioned moiety).

Examples of diamino multicyclic substantially planar aromatic bridging compounds which are useful in our invention include 3,7-benzidine sulfone (3,7-diaminodibenzothiophene-5,5-dioxide), mono-, di- or trisulfonted diaminodibenzothiophene-5,5-dioxide, dichlorodiaminodibenzothiophene-5,5-dioxide, diaminodimethyldibenzothiophene dioxide mono or disulfonic acid, dimethoxy benzidine sulfone and the like. We prefer 3,7-diaminodibenzothiophene-5,5-dioxide as the bridging element in view of the excellent fluorescent efficiency, chlorine stability, etc. of the corresponding bis triazole derivatives.

While any non-chromophore-containing aryl amine capable of coupling in a position ortho to the amino group may be used, we prefer naphthylamines. Examples of ortho amino couplers of the naphthalene series include 2-naphthylamine-5-sulfonic acid, 2-naphthylamine-7-sulfonic acid, 2-naphthylamine-8-sulfonic acid, 2-naphthionic acid, 2-naphthylamine-4,8-disulfonic acid, 2-naphthylamine, 2-amino-3-naphthalene carboxylic acid, H-acid (1-amino-8-hydroxy-3,6-naphthalene disulfonic acid), 1-amino - 4 - naphthalenesulfonamide, 2 - amino - 5- napthalenesulfonamide, 7-methoxy-2-naphthylamine, 2,-7-naphthylene diamine, 2-acetylamino-7-naphthyl amine and the like.

In preparing the azo dye intermediates of the desired triazoles, the ortho-amino coupling arylamine in dilute aqueous solution or suspension is treated with a solution of a tetrazotized diamine bridging component. The pH of the coupling reaction media is varied according to the coupling component used in the individual reaction, for example, the phenylenediamines were found to couple well in acid solution (pH 2–5); the anilines containing a solubilizing group such as sulfonic acid, sulfonamido, or a carboxylic acid group were found to couple well in alkaline solutions (pH 8–11); the naphthylamines are coupled in the presence of a solvent-coupling promoter such as a tertiary amine or tertiary N-heterocyclic compound such as pyridine in slightly acidic solutions (pH 4–6); the naphthylamine sulfonic acids are either coupled in the presence of sodium acetate in slightly acid solutions (pH 5–6), neutral solution or in alkaline solutions (pH 8–9).

While the acylamino aryl azo intermediates may be prepared directly from the corresponding acylamino arylamines by reaction with a tetrazotized bridge-linking diamine, it is also possible to prepare acylamino azo intermediates by acylation of the product of coupling of the arylene diamine coupler with the tetrazotized diamino bridge linking component. Suitable acylating agents include acetyl chloride, acetic anhydride, benzoyl chloride, benzene sulfonyl chloride, methane sulfonyl chloride, 2,4-dimethoxybenzoyl chloride, and the like.

The bis azo dye intermediates useful in this invention contain in each of the coupling component portions of the molecule a primary amino group which becomes a hetero atom of a triazole ring when the ortho, ortho' diamino bis azo dye is oxidized under suitable conditions. The crude bis azo reaction product from the coupling reaction is preferably recovered by filtration and the wet filter cake is slurried in water, a mild oxidizing agent added and the mixture heated with stirring until most of the color (of the azo dye) disappears. The fluorescent brightener is recovered by filtration. The procedure is varied somewhat based on the choice of the oxidizing agent. For example when one uses ammoniacal cupric sulfate as the oxidizing agent the resultant by-products of the reagent may be removed by adjustment of the pH of the solution, i. e. the reduction products of the oxidizing agents may be solubilized by making the solution more acidic so that the by-products are removed by filtration (e. g., present in the filtrate). Alternatively the byproducts may be removed in the filtrate by making the reaction media alkaline with ammonia (pH 11) prior to filtration. While we prefer to use metallic (ic→ous) oxidizing agents, one may use hydrogen peroxide, ferric ammonia sulfate, ferric chloride, potassium permanganate, potassium dichromate, calcium hypochlorite, sodium hypochlorite, sodium perborate, oxygen, etc. Passage of air through a hot solution or slurry of the ortho, ortho' diamino bis azo dye leads to the triazole ring formation very slowly and perhaps incompletely.

The bistriazole is recovered in the form of a paste on filtration of the oxidation mixture and may be used in this form or dried to a powder. If desired, the bistriazole may be purified by crystallization from a solvent, e. g. acetic acid, formamide.

The acid form (sulfonic acid, carboxylic acid, sulfonamide) of the bis triazole may be obtained by treatment of a salt thereof, e. g. the sodium salt, with a strong acid, e. g. mineral acids or strong organic acids.

The aqueous-alkali solubilized bis triazole may be converted to various metal or ammonium salts by treatment of the acid form with a metal (preferably alkali or alkali earth) hydroxide or carbonate, or with ammonia or a basic amine (e. g. pyridine, trimethylamine, triethanolamine).

An outstanding feature of the subject bistriazole "Clorox" stable brighteners is their desirable shade of fluorescence. The subject brightening agents having a blue shade of fluorescence, are more valuable to the trade because they impart to the carrier a more white appearance in daylight, i. e. without a pronounced green, or pink tint characteristic of many "brighteners." In particular, the bis naphtho triazole derivatives of dibenzothiophenedioxide have excellent substantivity for cotton and viscose rayon and impart a very desirable bluish white shade to these fibers unlike the objectionable greenish shade of the aroylamino derivatives of dibenzothiophenedioxide.

While the subject brighteners are particularly adapted to whitening of textiles, they have additional utility, e. g. when the bistriazoles are incorporated into paper or other wrapping material, an improvement in the whiteness as well as added protection of the contents from the action of ultra-violet light results. The white background of photographic prints and diazotype prints can be improved by incorporating small amounts of the bistriazole into the coating formulations. By addition of the bistriazoles to discharge pastes, the whites obtained upon discharge are decidedly whiter than those discharges made in the absence of said materials. If small quantities of the bistriazoles are added to soaps or other detergents, fibers which are washed using these formulations will be much whiter in the case of whites and much brighter in the case of colors than fabrics which are washed with ordinary soaps or detergents. These materials may be used to bleach fabrics. In such cases, the amount of bleach necessary is materially reduced and one or more steps in the bleaching operation may be eliminated.

The following examples in which parts are by weight, unless otherwise indicated, are illustrative of the instant invention and are not to be regarded as limitative.

Example I 6.2 parts of benzidine sulfone (3,7-diaminodibenzothiophene-5,5-dioxide), 125 parts water and 38 parts concentrated hydrochloric acid are heated to 90° C. for fifteen minutes to convert the benzidine sulfone to the hydrochloride. The mixture is then cooled to 5–10° C. and tetrazotized with a solution of 3.5 parts of sodium nitrite and 25 parts water. After the tetrazotization is complete any excess nitrous acid is destroyed by the addition of a small amount of a 10% sulfamic acid solution. The tetrazotized solution is added to a solution of 13.8 parts 2-naphthylamine-5-sulfonic acid and 160 parts of 20% sodium carbonate solution which was cooled by an ice water bath to 5–10° C. The mixture was stirred for 5–6 hrs. and the bisazo dye which was formed was agglomerated by the addition of 60 parts sodium chloride and heated on a steam bath (90–95° C.) for 2 hrs. The mixture was then cooled to room temperature and bisazo dye was separated by filtration. The wet cake of the bisazo dye was slurried with 200 parts of water. 41 parts concentrated ammonia and a solution of 21 parts cupric sulfate ($CuSO_4 \cdot 5H_2O$) and 30 parts water were added. The mixture was heated on a steam bath 90–95° C. for 8 hrs. during which time 50 parts of concentrated ammonia was gradually added. The bisazo dye was oxidized to the corresponding bistriazole by the cupric sulfate, and the color changed from purple to tannish brown. 10% wt./vol. of sodium chloride was added and sufficient concentrated ammonia to raise the pH to 11. The mixture was then cooled to room temperature, filtered, and dried in a vacuum oven at 75° C.

The obtained product which is useful as a fluorescent agent has the following structure:

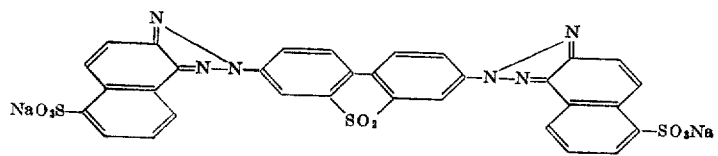

5 parts of Indian Head cotton fabric was treated with 100 parts of a water solution containing 0.00032 part of the bistriazole and 0.4 part soap for 20 minutes at 130° F. in a Launderometer. The cotton swatch was rinsed and dried. The brightness was measured in an adapted fluorescent photometer and was found to give a brightness reading of 50.1 which value is comparable to results obtained by commercially acceptable brighteners. On visual comparison, our product appears much whiter than related sulfone brighteners because of the bluer shade of fluorescence. Also, the rate of exhaustion on application to cotton of the subject compound is ⅓ to ½ more rapid than the rate of exhaustion of related sulfone brighteners in periods of 20 minutes and 60 minutes, respectively; so that the subject product is used more completely in dyeing operations.

100 parts of a water solution containing 0.00032 part bistriazole and 25 parts "Clorox" solution (15 parts "Clorox" per 1000 parts water) and 0.4 part soap were heated to 130° F. After 20 minutes sufficient reducing agent was added to destroy the "Clorox" and 5 parts Indian Head cotton fabric was added and placed in the Launderometer for 20 minutes at 130° F. The cotton swatch, after rinsing and drying, gave a brightness reading of 56.0 in the adapted fluorescent photometer.

Example II 18.5 parts of the dyestuff of the formula:

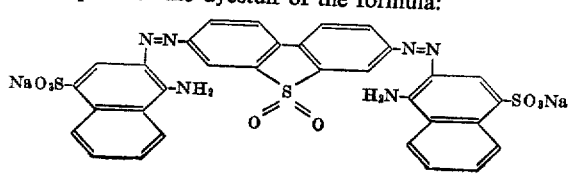

made by coupling tetrazotized benzidine sulfone with 1-amino-4-naphthalene-sulfonic acid, was oxidized to the bistriazole with cupric sulfate as in Example I to give the product of the formula:

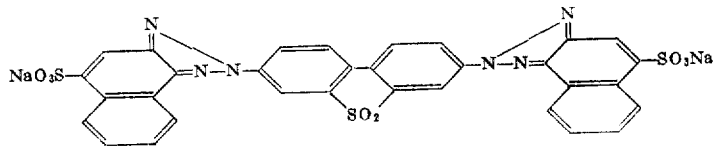

The product, when applied to cotton as in Example I, imparts an excellent fluorescent whiteness to the fabric of excellent Clorox stability.

*Example III*

18.5 parts of the dyestuff of the formula:

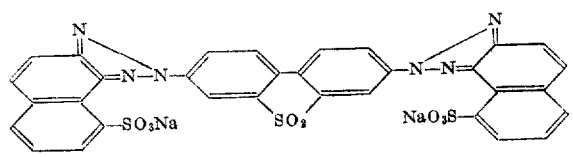

made by coupling tetrazotized benzidine sulfone with 2-amino-8-naphthalene-sulfonic acid, was oxidized to the corresponding bistriazole with cupric sulfate as in Example I to give the product of the following formula:

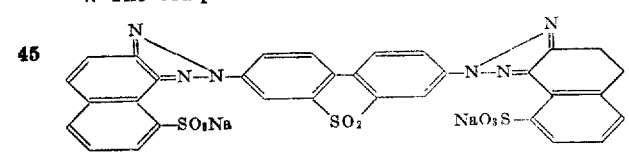

The product, when applied to cotton as in Example I, imparts an excellent whiteness to the fabric of excellent Clorox stability.

The benzotriazolyl stilbene and benzotriazolyl dibenzo-thiophene-5,5-dioxide whitening agents are the subject of the continuation-in-part copending patent application, Serial No. 469,044, filed November 11, 1954.

Various other modifications and variations of this invention will be obvious to a person skilled in the art and it is to be understood that such modifications and variations are to be included within the purview of this application and the spirit and scope of the appended claims.

We claim:

1. A compound of the formula:

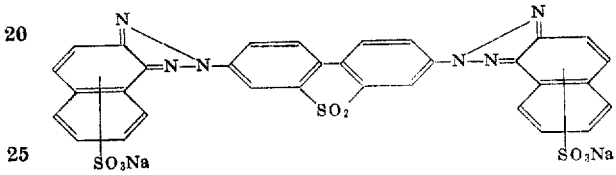

2. The compound of formula:

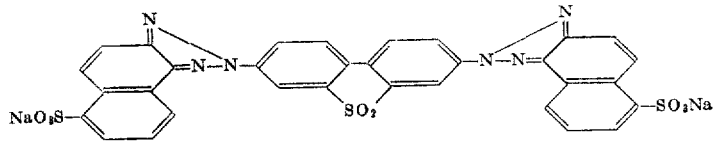

3. The compound of formula:

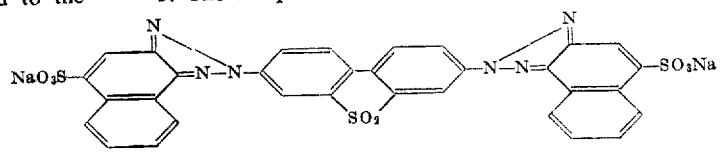

4. The compound of formula:

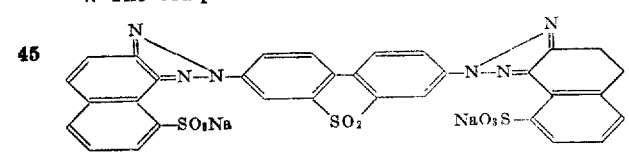

5. White organic materials having incorporated therein an effective amount of a whitening agent as defined in claim 1.

6. White organic materials having incorporated therein an effective amount of a whitening agent as defined in claim 2.

References Cited in the file of this patent

UNITED STATES PATENTS

| | | |
|---|---|---|
| 2,668,777 | Gold et al. | Feb. 9, 1954 |

FOREIGN PATENTS

| | | |
|---|---|---|
| 508,605 | Belgium | July 22, 1952 |

OTHER REFERENCES

Krepelka et al.: Chem. Abstracts, vol. 45, col. 6845 (1951).

UNITED STATES PATENT OFFICE
CERTIFICATE OF CORRECTION

Patent No. 2,733,165

January 31, 1956

William Wilson Williams et al.

It is hereby certified that error appears in the printed specification of the above numbered patent requiring correction and that the said Letters Patent should read as corrected below.

Column 1, lines 16 and 17, for "sulfanes", each occurrence, read -- sulfones --.

Signed and sealed this 26th day of April 1960.

(SEAL)
Attest:

KARL H. AXLINE
Attesting Officer

ROBERT C. WATSON
Commissioner of Patents